United States Patent [19]

Nankee et al.

[11] Patent Number: 4,543,364
[45] Date of Patent: Sep. 24, 1985

[54] RECOVERY OF POLYETHYLENE TEREPHTHALATE (PET)

[75] Inventors: Robert J. Nankee; Thomas A. Vivian; Kenneth O. Groves, all of Midland, Mich.

[73] Assignee: The Dow Chemical Company, Midland, Mich.

[21] Appl. No.: 681,354

[22] Filed: Dec. 13, 1984

[51] Int. Cl.⁴ ............................................. C08J 11/04
[52] U.S. Cl. ...................................... 521/40; 528/491; 528/497
[58] Field of Search ................... 521/40; 528/491, 497

[56] References Cited

U.S. PATENT DOCUMENTS

| | | | |
|---|---|---|---|
| 3,014,011 | 12/1961 | Zoetbrood | 528/497 X |
| 3,043,785 | 7/1962 | Wright et al. | 521/40 X |
| 3,390,134 | 6/1968 | Kibler | 528/491 X |
| 3,696,058 | 10/1972 | Teti | 521/40 |
| 3,935,169 | 1/1976 | Reen | 528/497 X |
| 4,345,039 | 8/1982 | Cowan et al. | 521/40 X |
| 4,346,209 | 8/1982 | Forschirm et al. | 528/497 X |

*Primary Examiner*—Lucille M. Phynes
*Attorney, Agent, or Firm*—Bruce M. Kanuch

[57] ABSTRACT

A method of reclaiming clear PET resin from bottles and other containers is disclosed. PET resin contaminated with a hot melt type polyethylene copolymer based glue is treated with a chlorinated solvent and optionally subjected to azeotropic drying.

12 Claims, No Drawings

RECOVERY OF POLYETHYLENE TEREPHTHALATE (PET)

BACKGROUND OF THE INVENTION

Yearly millions of pounds of polyethylene terephthalate (PET) go into the production of fabricated products such as containers, e.g., bottles, food containers, films, fibers and the like. This makes the resin an attractive material for recycling. In fact, there exists today a large business based on the recycling of PET. One drawback, however, to the known recycling techniques is that of being able to recover what is known in the industry as "clear" PET. Instead much "colored" PET is recovered. The colored material contains dark streaks or specs caused by the decomposition of glue and other foreign material upon melting of the PET (such as when processed into pellets for further use). The "colored" PET contains glue which was employed to adhere labels and bases to the containers. "Colored" PET has more limited uses than "clear" PET which can be refabricated into products which do not contain dark colors. Clear PET can be used to make fibers for clothing, insulation fiber fill, fish line, fabrics and other similar products.

Present known methods for recovering PET from containers and the like involves first mechanically removing non-PET solids such as metal bottle caps from a mixture thereof, and then forming the material into flakes containing PET, glue, labels (paper, etc.), and residue (e.g., soda pop) from the contents of the container. The flakes are then subjected to a sink/float separation in water and/or air to float off some of the less dense material such as paper and dissolve some of the residue contents (e.g., beverages) in water. The PET flakes sink along with some coated paper. The PET flakes are then subjected to one or more hot washings containing surface active agents, etc., to remove more paper and some of the glue. These methods are generally limited to the recovery of "colored" PET.

The present invention is directed to the recovery of "clear" PET from PET formed products, e.g., bottles, containers, film, etc., which are contaminated with a glue. The invention is also useful since solvent may be recovered.

SUMMARY OF THE INVENTION

Polyethylene terephthalate (PET) as employed herein means a polymer generally prepared by the reaction of either terephthalic acid (TPA) or dimethyl terephthalic acid (DMT) with ethylene glycol. Methods well known in the art can be employed to prepare the PET and do not present any limitation to the claimed invention. The resins are generally available in clear or green. Clear and green resins may be used for bottles which are to contain a carbonated beverage. The resins have an intrinsic viscosity ranging from about 0.62 to about 1.04. Fibers are produced from the lower intrinsic viscosity material while industrial fibers, film and strapping require higher intrinsic viscosity resin. Bottles are generally produced from resins having an intrinsic viscosity ranging from about 0.72 to about 0.85. The recycled polymer may be admixed with reinforcement materials such as glass fibers and/or fillers such as mica or other mineral fillers.

"Glue" as employed herein means a hot melt type adhesive such as interpolymers of ethylene and a comonomer such as a an a,b-ethylenically unsaturated acid, styrene-butadiene block copolymers, ethylene-vinyl acetate copolymers (EVA) which may be modified with standard additives such as waxes, tackifiers, fillers and the like.

"Chlorinated solvent" as employed herein means chloroform, $CCl_4$, methylene chloride, 1,1,1-trichloroethane, perchloroethylene, trichloroethylene and mixtures thereof, which is capable of dissolving "glue" at a temperature below the degradation temperature of PET.

"Azeotropic distillation" means a type of distillation in which a substance is added to the mixture to be separated in order to form an azeotropic mixture with one or more of the constituents of the original mixture. The azeotrope(s) formed will have boiling points different from the boiling points of the original mixture and permits greater ease of separation (Condensed Chemical Dictionary, Sixth Ed. Reinhold, 1964).

"Azeotropic mixture" (azeotrope) means a liquid mixture of two or more substances which behaves like a single substance in that the vapor produced by partial evaporation of liquid has the same composition as the liquid. The constant boiling mixture exhibits either a maximum or minimum boiling point as compared with that of other mixtures of the same substances. (Condensed Chemical Dictionary, Sixth Ed., Reinhold, 1964).

The azeotrope(s) involved in the practice of the present invention are composed essentially of water and at least one chlorinated solvent.

In the practice of the present invention, PET in particulate form and containing glue associated therewith is treated with a sufficient quantity of a chlorinated solvent capable of dissolving the glue to dissolve substantially all the glue. Excess chlorinated solvent (containing glue) is physically separated from the PET and the PET is then subsequently treated with water to form an azeotrope of water and any solvent remaining with the PET. The azeotrope is employed at a temperature at least above the boiling point of the azeotrope to thereby boil off the azeotrope, thus removing the solvent from the PET. This method of removing the solvent is referred to hereinafter as azeotropic drying. The solvent may be recovered from the azeotropic vapor and recycled to the process.

Any water remaining with the PET can be separated such as by filtration and drying, with or without the application of heat.

DETAILED DESCRIPTION OF THE INVENTION

Several processing techniques can be employed to accomplish the practice of the claimed invention. One important aspect of the invention, however, comprises the treatment of PET glue containing particles with a chlorinated solvent. Further improvements are achieved by the azeotropic drying of the particles employing water maintained at a temperature above the boiling point of the azeotropic formed of the water and chlorinated solvent. Preferably, the azeotropic vapor recovered from the drying step is treated to recover the chlorinated solvent which may then be recirculated to the glue separation stage of the process. By practicing this technology, substantial removal of solvent and glue from the PET flakes is achieved thus producing a "clear" PET. Moreover, almost complete recovery of the solvent may be effected.

The process is further exemplified by the following illustrative process schemes.

In the first scheme, washed PET resin particles ranging in size from about one-quarter to about one-half inch, in the longest direction, (PET resin particles with some glue, an ethylene-vinyl acetate hot melt type, and which have been subjected to a hot water float/sink washing) are placed in a chlorinated solvent comprising boiling perchloroethylene (/121° C.). After about one minute, the PET plastic resin is separated from the solvent by draining the mixture through a 200 mesh screen. The PET plastic resin (wet with perchloroethylene) is dipped for 120 seconds in a hot water bath at 99° C. The vapors from the hot water bath are collected in a water cooled condenser. The vapors will include essentially all the perchloroethylene present on the resin. About 99 percent of the solvent can be recovered from the solvent/water azeotrope. The resin can then be recovered from the hot water bath by straining the mixture through a 200 mesh screen. The resin is then air dried to remove excess water and to produce "clear" PET containing less than about 0.5 weight percent perchloroethylene.

The PET resin recovered in the foregoing process when heated to its melting point will be substantially free of contaminating color and can be classified as a "clear" resin. The residual perchloroethylene (0.5 weight percent) will be lost in water vaporizing during air drying of the particles and will generally be non-detectable after extrusion and pelletizing. Mesh measurements are made with U.S. Standard Sieve Series.

In another embodiment, raw PET bottle flake without aluminum caps (PET resin, paper with or without a polypropylene coating, glue-polyethylene/vinyl acetate type, polyethylene from the base, and beverage residue) is placed in water at room temperature. The "polyethylene base" is the separate item placed around the foot of the bottles to permit it to stand. After about five minutes, the paper and polyethylene (floated), beverage residue (it dissolves), and the PET resin with some paper (they sink) were separated by skimming/filtration for the polyethylene, and most of the paper and by a drainage/filtration for the PET resin and some of the paper. Conventional sink/float technology can be employed. Next the sink of PET resin, some paper, some glue, and water from the wetting of the solids is placed in a solvent bath comprising 1,1,1-trichloroethane at room temperature. After one minute, the paper and water (they float) and the glue (it dissolves) and the PET resin (it sinks) are separated by skimming/filtration for the float and a drainage/filtration for the sink. Since some glue and/or some paper may resist separating from the resin, one or two more like separations may be necessary for the PET resin to be classified as "clear" resin. The resin (wet with same solvent) is then dried with an azeotropic drying procedure (in a hot water bath at 85° to 99° C.) as described in the previous illustration. The recovered PET resin is "clear".

Methylene chloride may be substituted as a solvent for the 1,1,1-trichloroethane of the previous process scheme. Methylene chloride is somewhat more difficult to remove from the recovered PET resin because it has a very low viscosity and tends to be caught in small cracks and crevices of the particles. Thus, it is preferred to keep the treatment period to as short a time as possible.

In the following scheme, the same procedure is followed as in the second illustration above except that the raw PET bottle flake includes aluminum caps (PET resin, paper with or without a polypropylene coating, glue-polyethylene/vinyl acetate type, polyethylene base, beverage residue, and aluminum caps with paper/plastic/glue liner).

After the sink/float in water and before the sink/float in 1,1,1-trichloroethane, a sink/float step is added that includes perchloroethylene.

After five minutes, in the sink/float in perchloroethylene, the PET resin, any remaining paper and polyethylene, cap liners (they float), and the aluminum caps (they sink) are separated by a skimming/filtration process for the float and a drainage/filtration process for the sink. The float, wet with solvent is dried with the azeotropic drying procedure (in a hot water bath at 99° C.). This treated PET becomes the feed for the float/sink in 1,1,1-trichloroethane. The purpose of this step is to separate out the aluminum caps.

As previously illustrated, many process variations of the present invention can be employed for reclaiming "clear" PET from containers and the like which include a glue. The treatment with the chlorinated solvent can be carried out at elevated temperatures to facilitate the dissolution of glue. Temperatures up to the boiling point of the chlorinated solvent are useful. Furthermore, the contact may be made with vapors of the solvent. The following are examples of suitable azeotropes.

| Azeotrope | Boiling Point of Azeotrope |
|---|---|
| $H_2O$ (1.5% by wt) methylene chloride (98.5% by wt) | 38.1° C. |
| $H_2O$ (4.3% by wt) 1,1,1-trichloroethane (95.7% by wt) | 65.0° C. |
| $H_2O$ (5.4% by wt) trichloroethylene (94.6% by wt) | 73.3° C. |
| $H_2O$ (15.8% by wt) perchloroethylene (84.2% by wt) | 87.8° C. |

Standard azeotropic distillation technology, sink/float equipment, screening, and distillation equipment can be employed.

EXAMPLE 1

A sample of particulated unwashed PET obtained from a commercial retailer was treated in the following manner. The particulated PET contained paper, glue (EVA) and residual soda pop. The aluminum caps had been removed.

The sample (about 50 grams) was first washed with room temperature water (500 cc) in a sink/float process. The sink comprising PET and some paper was then treated with two portions (1000 cc in total) of 1,1,1-trichloroethane solvent in a sink/float scheme. The solvent was used at room temperature. Essentially all the paper floated to the top and was skimmed off. The last soak was continued for about 20 minutes and the PET recovered by screening the mixture through a 200 mesh screen (U.S. Standard Sieve Series). Analysis of the PET showed that it contained 166,021 ppm of 1,1,1-trichloroethane residue. The presence of solvent remaining on the PET resin particles was determined in this and the following examples by using a second chlorinated solvent in which the solvent used in the sample (first solvent) is soluble to extract the first solvent from the PET. Gas chromatography is used to determine the concentration of the first solvent in the extracting solvent. The quantity of first solvent is then calculated based on the weight of the original PET resin. In Example 1, methyl chloride was employed as the extracting solvent.

EXAMPLE 2

The procedure of Example 1 was repeated except that the recovered PET was placed into 95° C. water for about 30 seconds. The hot water was drained off and the amount of 1,1,1-trichloroethane retained on the PET was determined to be 175 ppm.

EXAMPLE 3

The foregoing Example 1 was repeated except that after screening the PET from the last solvent rinse, the PET was dried in air and put in an oven for one hour at 100° C. The 1,1,1-trichloroethane retained on the PET was determined to be 50 ppm.

EXAMPLE 4

The foregoing Example 1 was again repeated except that the screened PET was air dried at room temperature for one hour prior to determining the amount of 1,1,1-trichloroethane retained. In this example, the amount of 1,1,1-trichloroethane was determined to be 2,710 ppm.

The individual samples of PET recovered in Examples 1-4 were melted on a hot plate. Any liquid present evaporated. The PET was "clear" and was substantially free of paper.

EXAMPLES 5-8

The processes of Examples 1-4 were repeated employing no initial water rinse water but instead three washes with methylene chloride solvent were employed. The solvent was employed at 70° C. Results of the analysis of the amount of methylene chloride retained on the PET is set forth in the following Table I. Perchloroethylene was used as the extracting solvent.

TABLE I

| Example No. | Drying Technique | Methylene Chloride Retained on PET ppm |
|---|---|---|
| 5 | None - no final water rinse | 262,970 |
| 6 | None - water rinse at 70° C. for 30 seconds | 87,384 |
| 7 | Oven 1 hour and 20 minutes at 100° C. | 3,511 |
| 8 | Air dry 1 hour and 20 minutes at 27° C. | 6,867 |

The individual treated PET recovered in Examples 5-8 were melted on a hot plate. If liquid was present, it vaporized off. The PET was "clear" except for some glue retained on tiny bits of paper which had not been completely separately from the PET.

The residual methylene chloride can be reduced to lower levels if the PET is washed with water prior to the solvent sink/float steps. Example 6 was repeated with the modification that the PET was rinsed with water prior to the three rinses with methylene chloride solvent. When the recovered PET was melted no bits of paper were observed in the molten PET. It is also found preferable, in order to maintain low residual solvent levels, to have the contact time between the solvent and PET maintained as low as possible, e.g., less than about 5 minutes.

EXAMPLES 9-11

The processes of Examples 1-4 were repeated to show the effects of solvent removal. Details include the following.

PET flake which had been washed with water and containing glue (EVA), paper labels, and polyethylene from base cups was treated with 1,1,1-trichloroethane in a float/sink process as follows.

The PET flakes recovered after one minute wash with 1,1,1-trichloroethane were dried employing room temperature air, oven and azeotropic drying. The results are set forth in the following Table II.

TABLE II

| Example No. | Drying Technique | 1,1,1-Trichloroethane Retained on PET Flake, PPM |
|---|---|---|
| 9 | One hour at room temperature, 27° C. | 43,695 |
| 10 | One hour in oven at 100° C. | 49 |
| 11 | Azeotropic drying for 1 minute in hot water at 99° C. | 36 |

EXAMPLE 12

"Treated PET" obtained from a commercial recovery plant consisted of essentially recovered PET flake contaminated with a small amount of residual glue (ethylene-vinylacetate copolymer). The sample was evaluated for color by melting the flake at about 260° C. in an aluminum dish on a hot plate. The sample showed dark brown streaks and flecs over 90 percent of the sample.

The "treated PET" or feed was processed in pilot scale equipment as follows:
(1) The PET was washed in a vessel with agitation with 1,1,1-trichloroethane liquid for 20 minutes at room temperature, 70° F.
(2) The solvent was drained from the PET flake and the flake was conveyed at 200 lbs/hour into a vessel containing water at 199° F. It was determined by sampling that the PET flake contained about 20 percent by weight of solvent (1,1,1-trichloroethane) before entering the hot water bath.
(3) The PET flake was retained in the hot water vessel for 1 to 2 minutes, after which the PET flake was drained and conveyed to dewatering system. A Sample "A" of the PET was taken from the conveyor.
(4) Sample "A" was analyzed and the following parameters determined.
 (a) The PET product flake had about 8 percent surface water, which was easily removed in a subsequent drying step.
 (b) The PET product flake had about 58 ppm 1,1,1,-trichloroethane solvent residuals.
 (c) The PET product flake when dried and melted at about 260° C. showed less than about 5 percent by volume of dark brown streaks and flecs originally present in the feed. It was estimated that the original feed material contained about 90 percent by volume of the brown streaks and flecs.

EXAMPLE 13

The process of Example 12 was repeated except that the PET flake was conveyed at 50 pounds/hour to the vessel containing water at about 200° F. The results and other run details were the same except the PET flake product had only about 45 ppm 1,1,1-trichloroethane solvent residuals.

What is claimed is:

1. A process of recovering clear polyethylene terephthalate (PET) resin in particulate form substantially free from contaminating glue and paper which comprises: contacting glue- and paper-contaminated PET particles with a sufficient quantity of a chlorinated solvent to dissolve the glue from the PET and separating the solvent from the particles.

2. The process of claim 1 including the additional step of azeotropic drying of the PET resin following treatment with the chlorinated solvent employing water.

3. The process of claim 2 including the step of recovering the solvent from the azeotrope formed in the azeotropic drying step.

4. The process of claim 3 including the step of returning the recovered solvent to the glue removing step of the process.

5. The process of claim 1 wherein the solvent is selected from the group consisting of chloroform, CCl$_4$, 1,1,1-trichloroethane, methylene chloride, perchloroethylene, trichloroethylene or mixtures thereof.

6. The process of claim 5 wherein the contaminated PET is first washed with water prior to contact with the solvent.

7. The process of claim 5 wherein the PET is contacted with the solvent in liquid form maintained at a temperature up to the boiling point of the solvent.

8. The process of claim 5 wherein the PET is contacted with vapors of the solvent.

9. A process of removing paper and glue from scrap particulate polyethylene terephthalate (PET) resin which comprises:
   (a) rinsing the scrap PET with water to thereby form a float of paper and a sink of PET containing less paper and glue;
   (b) separating the PET from the water and float;
   (c) contacting the recovered PET from step (b) with a sufficient amount of a chlorinated solvent maintained at a temperature up to the boiling point of the solvent to dissolve substantially all glue in the PET and floating additional paper;
   (d) separating the PET from the solvent and floated paper; and
   (e) removing solvent remaining on the particulate PET by azeotropic distillation employing water.

10. The process of claim 9 wherein the solvent is selected from the group consisting of chloroform, CCl$_4$, methylene chloride, 1,1,1-trichloroethane, trichloroethylene, perchloroethylene or mixture thereof.

11. The process of claim 1 wherein as an additional step, separating the solvent from the azeotropic mixture and reusing the solvent in the process.

12. The process of claim 10 including as an additional step, separating the solvent from the azeotropic mixture and reusing the solvent in the process.

* * * * *